US012660840B2

(12) United States Patent
Han et al.

(10) Patent No.: US 12,660,840 B2
(45) Date of Patent: Jun. 23, 2026

(54) COMPOSITION CONTAINING POLYPHENOL

(71) Applicant: CJ CHEILJEDANG CORPORATION, Seoul (KR)

(72) Inventors: Jin Hee Han, Suwon-si (KR); Sung Yong Park, Suwon-si (KR)

(73) Assignee: CJ CHEILJEDANG CORPORATION, Seoul (KR)

(*) Notice: Subject to any disclaimer, the term of this patent is extended or adjusted under 35 U.S.C. 154(b) by 780 days.

(21) Appl. No.: 17/774,073

(22) PCT Filed: Nov. 6, 2020

(86) PCT No.: PCT/KR2020/015546

§ 371 (c)(1),
(2) Date: May 3, 2022

(87) PCT Pub. No.: WO2021/091322

PCT Pub. Date: May 14, 2021

(65) Prior Publication Data

US 2022/0400727 A1 Dec. 22, 2022

(30) Foreign Application Priority Data

Nov. 8, 2019 (KR) ........................ 10-2019-0142992
Sep. 24, 2020 (KR) ........................ 10-2020-0123836
Sep. 24, 2020 (KR) ........................ 10-2020-0123837

(51) Int. Cl.
*A23L 33/105* (2016.01)
*A23L 5/20* (2016.01)
*A23L 27/00* (2016.01)

(52) U.S. Cl.
CPC ............... *A23L 33/105* (2016.08); *A23L 5/20* (2016.08); *A23L 27/84* (2016.08); *A23V 2002/00* (2013.01)

(58) Field of Classification Search
CPC ........... A23L 33/105; A23L 5/20; A23L 27/84
See application file for complete search history.

(56) References Cited

U.S. PATENT DOCUMENTS

| | | | | |
|---|---|---|---|---|
| 4,927,651 | A | 5/1990 | Kumani et al. | |
| 5,932,623 | A | 8/1999 | Tanabe et al. | |
| 5,994,413 | A | 11/1999 | Tanabe et al. | |
| 8,197,875 | B2 | 6/2012 | Chien et al. | |
| 8,778,320 | B2 | 7/2014 | Hiramoto et al. | |
| 9,358,191 | B2 | 6/2016 | Hiramoto et al. | |
| 9,375,501 | B2 * | 6/2016 | Hiramoto | A61K 8/36 |
| 10,709,149 | B2 | 7/2020 | Muller | |
| 2007/0028935 | A1 * | 2/2007 | Bazemore | A61K 8/375 131/328 |
| 2010/0158840 | A1 * | 6/2010 | Hiramoto | A61L 9/013 424/65 |
| 2010/0173024 | A1 | 7/2010 | McDaniel | |
| 2014/0079836 | A1 | 3/2014 | McDaniel | |
| 2016/0022753 | A1 | 1/2016 | Aneja et al. | |
| 2016/0324911 | A1 * | 11/2016 | Fromentin | A61K 31/353 |
| 2018/0256663 | A1 | 9/2018 | Fromentin et al. | |
| 2018/0289030 | A1 * | 10/2018 | Muller | A23L 33/105 |
| 2019/0358282 | A1 | 11/2019 | Fromentin et al. | |
| 2020/0296987 | A1 | 9/2020 | Muller | |

FOREIGN PATENT DOCUMENTS

| | | | |
|---|---|---|---|
| JP | H02-100660 | A | 4/1990 |
| JP | H03-151837 | A | 6/1991 |
| JP | 2001151654 | A | 6/2001 |
| JP | 2001316295 | A | 11/2001 |
| JP | 2003210119 | A | 7/2003 |
| JP | 2004-167218 | A | 6/2004 |
| JP | 2005179373 | A | 7/2005 |
| JP | 2006-081544 | A | 3/2006 |
| JP | 2009-530014 | A | 8/2009 |
| JP | 2011-083282 | A | 4/2011 |
| JP | 2014230966 | A | 12/2014 |
| JP | 2016074628 | A | 5/2016 |
| KR | 1020110011365 | A | 2/2011 |
| KR | 10-1227345 | B1 | 1/2013 |
| KR | 20150016343 | A | 2/2015 |
| KR | 20180054660 | A | 5/2018 |
| KR | 10-2032715 | B1 | 10/2019 |
| WO | 2010/065567 | A2 | 6/2010 |
| WO | 2013/175253 | A1 | 11/2013 |
| WO | 2015-146147 | A1 | 10/2015 |
| WO | 2019-031326 | A1 | 2/2019 |

OTHER PUBLICATIONS

PCT International Search Report for PCT Application No. PCT/KR2020/015546 mailed Mar. 10, 2021 (5 pages, with English translation).
PCT International Written Opinion for PCT Application No. PCT/KR2020/015546 mailed Mar. 10, 2021 (3 pages).
Bai et al., "In vitro and in vivo characterization of the antibacterial activity and membrane damage mechanism of quinic acid against *Staphylococcus aureus*," J Food Sfe., 2017, e12416, pp. 1-9.
Magnani et al., "Caffeic acid: a review of its potential use in medications and cosmetics," Anal. Methods., 2014, 6:3203-3210.
Martillanes et al., "Applicaiton of Phenolic Compounds for Food Preservation: Food Additive and Active Packaging," Phenolic Compounds—Biological Activity, 2017, pp. 39-58.
Santana-Gálvez et al., "Chlorogenic Acid: Recent Advances on Its Dual Role as a Food Additive and a Nutraceutial against Metabolic Syndrome," Molecules, 2017, 22, 358 (21 pages).
Korean Office Action issued on Aug. 22, 2022 for Korean Patent Application No. 10-2020-0123837.
Office Action issued on Sep. 12, 2023 for the corresponding Australian patent application 2020379492 (8 pages).

(Continued)

*Primary Examiner* — Stephanie A Kohler
(74) *Attorney, Agent, or Firm* — Merchant & Gould P.C.

(57) ABSTRACT

The present application relates to a composition containing chlorogenic acid, caffeic acid, and quinic acid. The polyphenol-containing composition of the present application may be used for reducing an off-taste or off-flavor. In addition, the polyphenol-containing composition of the present application may be used as a preservative of a product, in particular an antioxidant or browning inhibitor of a product.

6 Claims, No Drawings

(56) References Cited

OTHER PUBLICATIONS

Aree, T., "Understanding structures and thermodynamics of β-cyclodextrin encapsulation of chlorogenic, caffeic and quinic acids: Implications for enriching antioxidant capacity and masking bitterness in coffee", Food Chemistry, 2019, vol. 293, pp. 550-560 (available Online Apr. 24, 2019).
Coffee bean Extract—"Health Ingredient for prevention against obesity, diabetes mellitus & maintenance of healthy weight" [Retrieved from internet on Sep. 11, 2023] <URL: http://www.oryza.co.jp/html/english/pdf/Coffee_Bean_Extract_4.0M.pdf> published on Jul. 24, 2011.
Office Action issued on Apr. 24, 2023 for the corresponding Japanese patent application 2022-526253 (4 pages).
Office Action issued on May 29, 2023 for the corresponding Australian patent application 2020379492 (6 pages).
Monente, C. et al., "Assessment of Total (Free and Bound) Phenolic Compounds in Spent Coffee Extracts", J. Agric. Food Chem., 2015, vol. 63, pp. 4327-4334.
Office Action issued on Mar. 4, 2025 for the corresponding Japanese Application No. 2023-205326 (4 pages including English Translation).

* cited by examiner

COMPOSITION CONTAINING POLYPHENOL

CROSS-REFERENCE TO RELATED APPLICATIONS

This application is a National Stage Application of PCT/KR2020/015546, filed 6 Nov. 2020, which claims priority to Serial Nos. 10-2019-0142992, filed on 8 Nov. 2019, 10-2020-0123836, filed on 24 Sep. 2020, and 10-2020-0123837, filed on 24 Sep. 2020, in the Republic of Korea and which applications are incorporated herein by reference. To the extent appropriate, a claim of priority is made to the above disclosed applications.

FIELD OF THE INVENTION

The present application relates to a composition comprising polyphenols and a use thereof.

DESCRIPTION OF THE RELATED ART

Polyphenols are compounds contained in plants such as fruits or leafy vegetables, and there are more than a few thousand types of polyphenols identified to date. Examples of representative polyphenols include flavonoids, anthocyanins, tannins, catechins, isoflavones, lignans, resveratrols, and the like. A plurality of hydroxyl groups (—OH) present in polyphenols have the property of easily binding to various compounds and have excellent antioxidant, anticancer, anti-inflammatory effects.

Although an individual polyphenol may exhibit an effect as a single substance, the effect may be increased by using each polyphenol in combination with other polyphenols, so the combination is known to be important (Korean Patent Publication No. 10-2015-0016343). However, there are various types of polyphenols, and thus it is difficult to confirm the synergistic effect of the combination.

PRIOR ART DOCUMENTS

Patent Documents

Korean Patent Publication No. 10-2015-0016343

DESCRIPTION OF THE INVENTION

Technical Problem

An aspect of the present application provides a composition comprising polyphenols that can be used for a variety of uses.

Technical Solution

According to an aspect of the present application, there is provided a composition containing chlorogenic acid, caffeic acid, and quinic acid.

According to another aspect of the present application, there is provided a method for reducing an off-taste or off-flavor, the method comprising adding a composition containing chlorogenic acid, caffeic acid, and quinic acid to a material generating the off-taste or off-flavor.

According to another aspect of the present application, there is provided a method for preparing an off-taste or off-flavor-reducing material, the method comprising adding a composition containing chlorogenic acid, caffeic acid, and quinic acid to a material generating the off-taste or off-flavor.

According to another aspect of the present application, there is provided a use of a composition containing chlorogenic acid, caffeic acid, and quinic acid as an off-taste-reducing agent or off-flavor-reducing agent.

According to another aspect of the present application, there is provided a composition for preserving a product, the composition containing chlorogenic acid, caffeic acid, and quinic acid is provided.

According to another aspect of the present application, there is provided a method for preventing oxidation of a product, the method comprising adding a composition containing chlorogenic acid, caffeic acid, and quinic acid to the product.

According to another aspect of the present application, there is provided a method for inhibiting browning of a product, the method comprising adding a composition containing chlorogenic acid, caffeic acid, and quinic acid to the product.

Advantageous Effects of the Invention

The composition containing chlorogenic acid, caffeic acid, and quinic acid of the present application may be used for a variety of uses.

The composition of the present application may be used for reducing an off-taste or off-flavor. The composition of the present application has a remarkable ability to reduce trimethylamine (TMA), which is an off-taste or off-flavor-causing material, and an excellent effect of reducing an off-taste or off-flavor by inducing changes in various volatile aroma components.

In addition, unlike conventionally used materials for reducing an off-taste or off-flavor, the composition of the present application remains a little in a product, and thus it does not affect the original properties of the product and can be easily applied to a manufacturing process for a processed product.

In addition, the composition containing chlorogenic acid, caffeic acid, and quinic acid of the present application may be used for preserving the product, and specifically, for preventing oxidation or inhibiting browning of the product.

As confirmed from the DPPH radical scavenging ability, the polyphenol composition of the present application has an excellent antioxidant effect, excellent oxidation stability, and high polyphenol oxidase inhibitory activity, and thus has browning inhibitory activity.

Also, unlike conventional antioxidants or browning inhibitors, the composition of the present application remains a little in a product, and thus it does not affect the original properties of the product and can be easily applied to a manufacturing process for a processed product.

However, the effects of the present application are not limited to the above-mentioned effects and other effects not mentioned will be clearly understood from the following description by a person skilled in the art.

DETAILED DESCRIPTION OF THE PREFERRED EMBODIMENT

Hereinafter, the present application will be specifically described.

According to one aspect of the present application, there is provided a composition containing chlorogenic acid, caffeic acid, and quinic acid.

The chlorogenic acid, caffeic acid, and quinic acid, which are the active ingredients of the present application, are polyphenol components.

The term "polyphenol" as used in the present application refers to a compound containing one or more phenols having one or more hydroxyl groups in a molecule. In the present specification, the term "polyphenol" is used to include not only the polyphenol itself but also its derivatives, such as glycosides, alkylated compounds, esterified compounds, and the like.

In the present application, the chlorogenic acid is an ester compound between caffeic acid and quinic acid and represented by Formula 1 below:

[Formula 1]

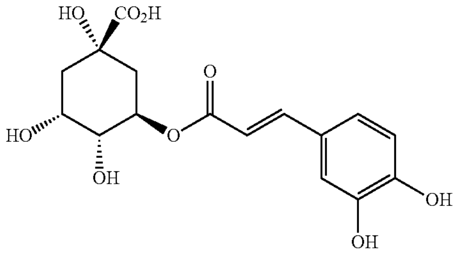

In the present application, the caffeic acid is a compound classified as hydroxycinnamic acid and represented by Formula 2 below:

[Formula 2]

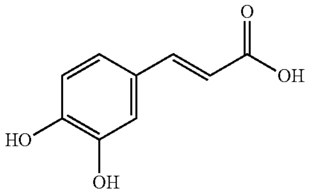

In the present application, the quinic acid is represented by Formula 3 below:

[Formula 3]

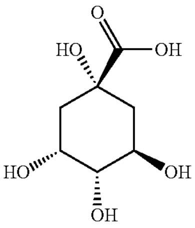

The chlorogenic acid, caffeic acid, and quinic acid used in the present application may be ones derived from natural products as well as artificially synthesized ones.

The natural product may include, without limitation, any substance containing chlorogenic acid, caffeic acid, and/or quinic acid, but it may be a plant. Specifically, examples of the plant include aloe, anise seeds, elder, eleutherococcus, psyllium, orange flower, allspice, oregano, valerian, chamomile, capsicum pepper, cardamon, cassia, garlic, caraway seeds, clove, cumin seeds, kola, coriander seeds, Rhus lavanica, saffron, zanthoxylum, juniper berry, cinnamon, ginger, star anise, St. Johns wart, celery seed, savory, sesame, pieplant, tarragon, turmeric, thistle, dill seed, nutmeg, nettle, hibiscus, hamamelis, birch, basil, bitter orange, fennel, primrose, fenugreek, verbena, bay laurel, hop, boldo, horseradish, poppy seed, gallnut, marigold, marrow, marjoram, mustard, Millefeuille, mint leaves, melissa, mace, lindane, gentian, rosehip, rosemary, Rosmarinus officinalis, sunflower seeds, grape pericarp, apple, carrot leaves, banana, strawberry, apricot, peach, plum, pineapple, Nashi pear, persimmon, cherry, papaya, mango, avocado, melon, loquat, fig, kiwi, prune, blueberry, black berry, raspberry, cranberry, coffee beans, cacao beans, grape seeds, grape fruits seeds, pecan nut, cashew nut, chestnut, coconut, peanut, walnut, green tea leaves, black tea leaves, oolong tea leaves, tobacco, perilla leaves, garden thyme, sage, lavender, spearmint, peppermint, spotted thistle, hyssop, sweet basil, marigold, dandelion, artichoke, Matricaria chamomille, *Agrimonia pilosa* var. *japonica*, licorice, anise, yarrow, eucalyptus, wormwood, balm, Angelica pubescens, fenugreek, *Capsicum annuum* var. *angulosum*, fennel, red pepper, coriander seeds, caraway seeds, fennel seeds, ginger, horseradish, *Origanum majorana, Origanum valgare*, mustard, parsley, pepper, savory, tarragon, queen lily, wasabi, dill seeds, citrus fruits, and the like.

Ones separated and purified from the natural product by a known method in the art, for example, a known extraction method, may be used.

The content ratio of chlorogenic acid, caffeic acid, and quinic acid in the composition of the present application is not limited. The total content of chlorogenic acid and caffeic acid may be in a range consisting of one lower limit selected from 0.1 parts by weight, 0.3 parts by weight, 0.4 parts by weight, 0.5 parts by weight, 0.7 parts by weight, 0.8 parts by weight, 0.9 parts by weight, 1 parts by weight, 1.1 parts by weight, 1.2 parts by weight, 1.3 parts by weight, 1.4 parts by weight, 1.5 parts by weight, 10 parts by weight, 50 parts by weight, and 100 parts by weight, and/or one upper limit selected from 700 parts by weight, 600 parts by weight, 500 parts by weight, 480 parts by weight, 470 parts by weight, 460 parts by weight, 450 parts by weight, 400 parts by weight, 350 parts by weight, 330 parts by weight, 320 parts by weight, 310 parts by weight, 300 parts by weight, 250 parts by weight, 240 parts by weight, 230 parts by weight, 210 parts by weight, 200 parts by weight, and 100 parts by weight, based on 100 parts by weight of quinic acid. For example, the total content of chlorogenic acid and caffeic acid may be 0.1 to 700 parts by weight, 0.3 to 600 parts by weight, 0.5 to 600 parts by weight, 0.7 to 500 parts by weight, 0.7 to 470 parts by weight, 0.7 to 460 parts by weight, 0.8 to 460 parts by weight, 0.8 to 450 parts by weight, 0.8 to 310 parts by weight, 0.8 to 300 parts by weight, 0.8 to 270 parts by weight, 0.8 to 250 parts by weight, or 0.9 to 240 parts by weight, based on 100 parts by weight of quinic acid.

For the content ratio of chlorogenic acid and caffeic acid, the content of caffeic acid may be in a range consisting of one lower limit selected from 10 parts by weight, 30 parts by weight, 35 parts by weight, 37 parts by weight, 39 parts by weight, 40 parts by weight, 45 parts by weight, 49 parts by weight, 50 parts by weight, and 70 parts by weight, and/or one upper limit selected from 400 parts by weight, 300 parts by weight, 200 parts by weight, 150 parts by weight, 120 parts by weight, 110 parts by weight, and 100 parts by weight, based on 100 parts by weight of chlorogenic acid. For example, the content of caffeic acid may be 10 to 400 parts by weight, 30 to 300 parts by weight, 35 to 200 parts by weight, 35 to 150 parts by weight, 39 to 150 parts by weight, 39 to 120 parts by weight, 39 to 110 parts by weight, or 40 to 100 parts by weight, based on 100 parts by weight of chlorogenic acid.

The effects of the combination of polyphenols can be exhibited in the content ratio of chlorogenic acid, caffeic acid, and quinic acid.

In view of a use of the composition, the content of caffeic acid, chlorogenic acid, and quinic acid can be adjusted without limitation. Based on the composition, the total content of caffeic acid, chlorogenic acid, and quinic acid may be in a range consisting of one lower limit selected from 0.1 ppm, 0.5 ppm, 1 ppm, 10 ppm, 20 ppm, 40 ppm, 50 ppm, 80 ppm, 100 ppm, 120 ppm, 140 ppm, 145 ppm, 149 ppm, and 150 ppm, and/or one upper limit selected from 5,000 ppm, 2,000 ppm, 1,000 ppm, 500 ppm, 300 ppm, 250 ppm, 230 ppm, and 200 ppm. For example, based on the composition, the total content of caffeic acid, chlorogenic acid, and quinic acid may be 0.1 ppm to 5,000 ppm, 1 ppm to 2,000 ppm, 50 ppm to 1,000 ppm, 100 ppm to 1,000 ppm, 120 ppm to 1,000 ppm, 120 ppm to 500 ppm, 140 ppm to 300 ppm, 140 ppm to 250 ppm, 140 ppm to 230 ppm, 145 ppm to 230 ppm, 145 ppm to 200 ppm, 149 ppm to 200 ppm, or 150 ppm to 200 ppm. The "ppm" may refer to a weight ratio (w/w).

The composition of the present application may further comprise the other polyphenols other than chlorogenic acid, caffeic acid, and quinic acid.

Specifically, examples of other polyphenols include, without limitation, phenolic acids, flavonoids, stilbens, lignin, etc. For example, other polyphenols include, but are not limited to, isorhamnetin, isorhamnetin glycosides, catechin, epicatechin, gallocatechin, epicatechin gallate, epigallocatechin, epigallocatechin gallate, ellagic acid, catechol, caffeic esters, kaempferol, kaempferol glycosides, quercetin, quercetin glycosides, quercetagenin, genistin, genistin glycoside, tannic acid, anthocyanin, hydroquinone, hesperetin, hesperidin, gallic acid, gallic esters (lauryl gallate, propyl gallate, butyl gallate), 4-methylcatechol, 5-methylcatechol, 4-methoxycatechol, 5-methoxycatechol, methylcatechol-4-carboxylic acid, 2-methylresorcinol, 5-methylresorcinol, lignin, limocitrin, limocitrin glycosides, limocitrol, luteolin, luteolin glycosides, luteolinidin, luteolinidin glycosides, rutin, resorcin, resveratrol, resorcinol, leukocyanidin, leukodelphinidin, and the like.

In addition to the polyphenol components, the composition of the present application may further contain a variety of nutritional supplements, vitamins, electrolytes, flavors, colorants, pectic acid and its salts, alginic acid and its salts, organic acids, protective colloidal thickeners, pH adjusting agents, stabilizers, preservatives, glycerin, alcohols, carbonating agents, and the like.

Specifically, the composition of the present application may include vitamin A, vitamin C, vitamin D, vitamin E, vitamin B1, vitamin B2, vitamin B6, vitamin B12, niacin, biotin, folate, pantothenic acid, and the like. In addition, the composition of the present application may include minerals such as zinc (Zn), iron (Fe), calcium (Ca), chromium (Cr), magnesium (Mg), manganese (Mn), copper (Cu), and the like. In addition, the composition of the present application may include amino acids such as lysine, tryptophan, cysteine, valine, and the like. In addition, the composition of the present application may include monosaccharides, such as glucose and fructose; disaccharides such as maltose and sucrose; polysaccharides such as dextrin and cyclodextrin; and sugar alcohols, such as xylitol, sorbitol, and erythritol. In addition, the composition of the present application may include food additives, such as a preservative, including potassium sorbate, sodium benzoate, salicylic acid, sodium dehydroacetate, etc; a disinfectant, including bleaching powder and high-grade bleaching powder, sodium hypochlorite, etc.; an antioxidant, including butylhydroxyanisole (BHA), butylhydroxytoluene (BHT), etc.; a colorant, including tar pigment; a color fixing agent, including sodium nitrite and sodium acetate; a bleaching agent, including sodium sulfite; a seasoning agent, including sodium glutamate (MSG); a sweetener, including natural sweeteners such as thaumatin and stevia extract, and synthetic sweeteners such as saccharin and aspartame; a flavor, including vanillin and lactones; an inflating agent, including alum and potassium D-bitartrate; a fortifying agent, an emulsifying agent, a thickener (thickening agent), a coating agent, a gum base agent, an anti-foaming agent, a solvent, a modifier, and the like.

The additive may be selected according to the type of a food and used in an appropriate amount.

In an embodiment, the composition of the present application may be used for reducing an off-taste or off-flavor.

In the present application, the "off-taste" refers to a taste that gives an unpleasant or disgusting feeling caused by a component itself contained in a product or a secondary chemical change of the component or a substance incorporated from outside.

In the present application, the "off-flavor" refers to an odor that gives an unpleasant or disgusting feeling caused by a component itself contained in a product or a secondary chemical change of the component or a substance incorporated from outside.

Examples of a material generating the off-taste or off-flavor include nitrogenous compounds, sulfur compounds, lower fatty acids, carbonyl compounds, esters, phenols, alcohols, hydrocarbons, or chlorine compounds.

Specifically, the off-flavor may be a fishy smell. The fishy smell may be derived from plants or seafood, and specifically, from fish.

The nitrogenous compounds may include, without limitation, any substance that may cause a bad smell, such as ammonia, trimethylamine, piperidine, trimethyl oxide, etc., and specifically, it may be trimethylamine.

The material generating the off-taste or off-flavor may be a volatile aroma components. The volatile aroma components may be, but are not limited to, one or more compounds selected from the group consisting of hexaldehyde (hexanal), heptanal, 2-nonenal ((Z)—), 2,4-heptadienal ((E,E)-), 2-hexenal ((E)-), 2,6-nonadienal ((E,Z)—), 2-nonanone, 2-pentenal ((E)-), 1-penten-3-one, disulfide compounds, and dimethyl compounds.

The composition containing chlorogenic acid, caffeic acid, and quinic acid, of the present application may be usefully employed for reducing the off-taste or off-flavor.

According to another aspect of the present application, there is provided a method for reducing an off-taste or off-flavor, the method comprising adding the above-described composition of the present application to the material generating the off-taste or off-flavor.

According to another aspect of the present application, there is provided a method for preparing a material for reducing an off-taste or off-flavor, the method comprising adding the above-described composition of the present application to the material generating the off-taste or off-flavor.

According to another aspect of the present application, there is provided a composition for preserving a product, the composition containing chlorogenic acid, caffeic acid, and quinic acid.

In one embodiment, the composition for preserving a product may be used for preventing oxidation or inhibiting browning of the product.

In other embodiment, the product to be preserved, oxidation-prevented, or browning-inhibited may be a food product, a feed product, a household item, or an industrial item.

The content ratio of chlorogenic acid, caffeic acid, and quinic acid in the composition for preserving the product of the present application is not limited. The total content of chlorogenic acid and caffeic acid may be in a range consisting of one lower limit selected from 0.1 parts by weight, 0.3 parts by weight, 0.4 parts by weight, 0.5 parts by weight, 0.7 parts by weight, 1 parts by weight, 1.1 parts by weight, 1.3 parts by weight, 1.4 parts by weight, 10 parts by weight, 50 parts by weight, 100 parts by weight, and 150 parts by weight, and/or one upper limit selected from 700 parts by weight, 600 parts by weight, 500 parts by weight, 450 parts by weight, 400 parts by weight, 350 parts by weight, 340 parts by weight, 330 parts by weight, 320 parts by weight, 310 parts by weight, 300 parts by weight, 250 parts by weight, 240 parts by weight, 230 parts by weight, 210 parts by weight, 200 parts by weight, and 150 parts by weight, based on 100 parts by weight of quinic acid. For example, the total content of chlorogenic acid and caffeic acid may be 0.1 to 700 parts by weight, 0.3 to 600 parts by weight, 0.5 to 600 parts by weight, 1 to 500 parts by weight, 10 to 450 parts by weight, 50 to 450 parts by weight, 100 to 400 parts by weight, 150 to 350 parts by weight, 200 to 350 parts by weight, or 200 to 300 parts by weight, based on 100 parts by weight of quinic acid.

For the content ratio of chlorogenic acid and caffeic acid, the content of caffeic acid may be in a range consisting of one lower limit selected from 10 parts by weight, 30 parts by weight, 35 parts by weight, 39 parts by weight, 40 parts by weight, 45 parts by weight, 49 parts by weight, 50 parts by weight, 70 parts by weight, 80 parts by weight and 90 parts by weight, and/or one upper limit selected from 400 parts by weight, 300 parts by weight, 200 parts by weight, 150 parts by weight, 140 parts by weight, 130 parts by weight, 120 parts by weight, 110 parts by weight, and 100 parts by weight, based on 100 parts by weight of chlorogenic acid. For example, the content of caffeic acid may be 10 to 400 parts by weight, 30 to 300 parts by weight, 35 to 200 parts by weight, 40 to 150 parts by weight, 50 to 140 parts by weight, 60 to 130 parts by weight, 70 to 120 parts by weight, or 80 to 120 parts by weight, based on 100 parts by weight of chlorogenic acid.

With respect to the composition for preserving the product, according to one aspect of the present application, for the same contents, among details about polyphenol components, details about the other components other than polyphenol components, and details about their contents, as in the description of the "composition containing chlorogenic acid, caffeic acid, and quinic acid" according to another aspect of the present application, described above, a quotation to the description that has already been described is used and the description will not be described redundantly to avoid complexity.

The composition containing chlorogenic acid, caffeic acid, and quinic acid, of the present application has excellent antioxidant effect, and thus, can be used as an antioxidant.

The composition containing chlorogenic acid, caffeic acid, and quinic acid of the present application can replace synthetic antioxidants such as butylated hydroxyanisole (BHA), butylated hydroxytoluene (BHT), tertiary butylhydropuinone (TBHQ), and the like.

In one embodiment, the composition of the present application has an activity of effectively inhibiting oxidation of fat or protein due to a free radical inhibitory activity.

The composition containing chlorogenic acid, caffeic acid, and quinic acid of the present application may be used as a browning inhibitor.

The composition of the present application has an outstanding polyphenol oxidase inhibitory activity, and thus, has an excellent browning inhibitory activity.

The browning inhibitor in the present application may be one that inhibits browning itself caused by oxidation of phenolic compounds and one that inhibits browning caused by a reaction between sugars, amino acids, and the like.

According to another aspect of the present application, there is provided a method for preventing oxidation of a product, the method comprising adding a composition containing chlorogenic acid, caffeic acid, and quinic acid to the product.

According to another aspect of the present application, there is provided a method for inhibiting browning a product, the method comprising adding a composition containing chlorogenic acid, caffeic acid, and quinic acid to the product.

The composition containing chlorogenic acid, caffeic acid, and quinic acid of the present application can be applied to a variety of products.

The compositions of this application can be applied, without limitation, to a food product, a feed product, a household item, an industrial item, etc. Specific examples of the food product or feed product include, but are not limited to, processed grain products, vegetables, fruits, dried or cut products of vegetables, fruit juice, vegetable juice, mixed juice of vegetables and fruits, chips, noodles, processed livestock food, processed seafood, processed dairy products, fermented milk food products, microbial fermented food, confectionery and bakery, seasonings, processed fish/meat products, acidic beverages, processed foods, convenience foods, licorice, herbs, insect feed, livestock feed, pet feed, etc.

The processed fish/meat products mean ham, sausage, bacon, dried and stored meat, seasoned meat, packaged meat, ground meat products, processed rib products, products extracted from meat, edible beef tallow, edible pork fat, a lump of fish meat, etc. that are processed by using meat or fish meat as raw materials. The "meat" may be, but not limited to, meat commonly used in dietary customs, edible organs and by-products of cattle, swine, sheep, goats, rabbits, chickens, turkeys, ducks, pheasants and quails. Types of the processed meat products include, but are not limited to, sterilized meat products, ham, press ham, mixed press ham, sausage, mixed sausage, dried sausage (dried mixed sausage), semi-dried sausage (semi-dried mixed sausage), heated frozen sausage, bacon, dried stored meat, seasoned meat, ground meat products, processed rib products, packaged meat, and other processed meat products.

The composition of the present application may be variously formulated in the form of liquid, solid, powder, or the like, by using a convenient and appropriate method for a particular use. The composition of the present application can be combined with raw materials during a preparation process and evenly distributed over a food, by immersion, by stirring after the immersion, by spraying, or by direct mixing.

According to another embodiment of the present application, there is provided a composition containing quinic acid for reducing an off-taste or off-flavor.

The description of the composition containing quinic acid for reducing an off-taste or off-flavor is as described above.

The composition containing quinic acid for reducing an off-taste or off-flavor may further comprise polyphenols other than quinic acid, specifically, phenolic acids and/or quinic acid derivatives.

The composition containing quinic acid for reducing an off-taste or off-flavor may be 10 wt % or more, 30 wt % or more, 50 wt % or more, 70 wt % or more, 90 wt % or more, or 99 wt % or more, based on 100 wt % of polyphenols.

Hereinafter, the present application will be described in detail through Examples. However, the following Examples specifically illustrate the present application, and the contents of the present application are not limited by the following Examples.

EXAMPLES

Experimental Example 1: Preparation of Polyphenol-Containing Compositions

1. Experimental Materials

Polyphenols used in the experiment were chlorogenic acid, caffeic acid, gallic acid, catechin, ferulic acid, and quinic acid purchased from Sigma-Aldrich (St. Louis. Mo. USA) as single compounds.

2. Composition of Polyphenol-Containing Compositions

The polyphenol-containing compositions of T1 to T6 were prepared by mixing the same content of 50 ppm of three individual polyphenol compounds in the composition shown in Table 1 below.

TABLE 1

| No. | Composition | T1 | T2 | T3 | T4 | T5 | T6 |
|---|---|---|---|---|---|---|---|
| 1 | Polyphenol 1 | Chlorogenic acid | Chlorogenic acid | — | Chlorogenic acid | Catechin | Chlorogenic acid |
| 2 | Polyphenol 2 | Caffeic acid | Caffeic acid | — | Caffeic acid | Caffeic acid | Catechin |
| 3 | Polyphenol 3 | Quinic acid | — | Quinic acid | Ferulic acid | Quinic acid | Quinic acid |

3. The Content Ratio of Polyphenol-Containing Compositions

From T1 composition, which exhibited the best effect among the compositions of mixed polyphenols, the ratio of the content (unit: ppm) of chlorogenic acid, caffeic acid, and quinic acid was adjusted to prepare various polyphenol-containing compositions of S1 to S6 shown in Table 2 below.

TABLE 2

| No. | Composition | S1 | S2 | S3 | S4 | S5 | S6 |
|---|---|---|---|---|---|---|---|
| 1 | Chlorogenic acid | 50 | 1.5 | 1.04 | 0.74 | 81.8 | 56.3 |
| 2 | Caffeic acid | 50 | 0.6 | 1.04 | 0.74 | 40.9 | 56.3 |
| 3 | Quinic acid | 50 | 147.9 | 148 | 148.51 | 27.3 | 37.5 |

Experimental Example 2: Trimethylamine (TMA) Analysis

1. Trimethylamine (TMA) Standard Preparation

30% concentration product of trimethylamine was purchased from Duksan Chemistry (Ansan, Republic of Korea) and used in the experiment. To determine the TMA-reducing effect, the standard reagent of 30% trimethylamine was diluted with distilled water to 100 ppm to prepare a standard aqueous solution. The prepared standard aqueous solution was used as a solvent to prepare a test polyphenol composition, and a trimethylamine-containing polyphenol composition sample was prepared and used for GC/MS analysis.

2. Analysis of Trimethylamine (TMA) Component and Content

The trimethylamine (TMA) component was determined from the polyphenol composition through the following method. For adsorption for the analysis of volatiles, SPME (Solid Phase Microextraction Fiber Holder, Supelco., Bellefonte, PA, USA) was pretreated by using DVB/CAR/PDMS (50/30 μm). 1 mL of the pretreated composition was put into a 20 mL EPA vial, followed by capping with PTFE/Silicon. The SPME needle was inserted into the composition-added vial and used for GC/MS analysis after adsorption for 30 minutes at 60° C.

For GC/MS analysis, Agilent gas chromatograph (GC2010 plus, Agilent, USA) was used with DB-5MS column (thickness: 0.25 μm, length: 30 m, diameter: 0.25 mm). He was used as a carrier gas, and the column oven temperature was set to be 100° C., the injection temperature was set to be 200° C., the total flow was set to be 1.10 mL/min, and the total program time was set to be 37 minutes, and then analysis was performed. The amount of TMA in the composition was calculated by comparing the peak area of 1.0 g of the sample and 1 g of 100 mg/L of TMA relative to each other and performing the comparative relative quantification of the contents of volatile aroma components in the sample.

Experimental Example 3: the Effect of the Composition of Polyphenols on Trimethylamine (TMA) Reduction To determine the superiority of the combination of chlorogenic acid, caffeic acid, and quinic acid, the TMA reducing effect, which is known to be an effect of polyphenols, was evaluated. Specifically, the trimethylamine (TMA)-reducing effect was evaluated through the method of Experimental example 2 for each polyphenol composition prepared in Experimental example 1-2.

TABLE 3

| Composition | Reduction (%) |
|---|---|
| T1 | 80.36 |
| T2 | 65.45 |
| T3 | 57.66 |
| T4 | 43.96 |
| T5 | 40.13 |
| T6 | 41.31 |

As determined in the results in Table 3 above, it was found that the combination of chlorogenic acid, caffeic acid, and quinic acid (T1 composition) showed the most excellent TMA-reducing effect compared to the other polyphenol combinations.

Experimental Example 4: The Effect of the Composition Ratio of Polyphenol Compositions on Trimethylamine (TMA) Reduction The trimethylamine (TMA)-reducing effect was evaluated through the method of Experimental example 2 for polyphenol compositions with different component content prepared in Experimental example 1-3.

TABLE 4

| Composition | Reduction (%) |
|---|---|
| S1 | 90.55 |
| S2 | 94.99 |
| S3 | 98.32 |
| S4 | 91.85 |
| S5 | 74.61 |
| S6 | 88.45 |

As can be seen in Table 4 above, it was found that the TMA-reducing effect was maintained, even when changing the content of chlorogenic acid, caffeic acid, and quinic acid.

Experimental Example 5: Analysis of Volatile Aroma Components

1. Experimental Method

To determine the rancid flavor-reducing effect of the polyphenol compositions, the compositions were applied to fish oil, and then analysis of volatile aroma components was performed.

For adsorption for the analysis of volatiles, SPME (Solid Phase Microextraction Fiber Holder, Supelco., Bellefonte, PA, USA) was pretreated by using DVB/CAR/PDMS (50/30 μm). For samples used in the experiment, the polyphenol composition was added to fish oil, and then 1 g of fish oil, in which accelerated oxidation was induced in a 45° C. incubator for 72 hours, was placed in a 20 mL EPA vial, followed by capping with PTFE/Silicon. The SPME needle was inserted into the sample-added vial and used for GC/MS analysis after adsorption for 30 minutes at 60° C.

For GC/MS analysis, Agilent gas chromatograph (GC2010 plus, Agilent, USA) was used with DB-5MS column (thickness: 0.25 μm, length: 30 m, diameter: 0.25 mm). He was used as a carrier gas, and the column oven temperature was set to be 100° C., the injection temperature was set to be 200° C., the total flow was set to be 1.10 mL/min, and the total program time was set to be 37 minutes, and then analysis was performed. The obtained result values were converted to peak area values and compared. As the experimental results, the compounds having the rancid flavor were identified, and the rancid flavor-reducing effect was found out.

2. Analysis of Experimental Results

The most impeding factor in using fish oil is the occurrence of fishy smell and rancid flavor. This is due to the high content of polyunsaturated fatty acids in fish oil. Therefore, it seemed that the content of natural antioxidants such as tocopherol is small, and the nitrogenous compounds contained in fish oil bind to the polyunsaturated fatty acids and are oxidized to accelerate the occurrence of the rancid flavor.

The result of measuring the change in the main volatile aroma components generated from application of the polyphenol compositions to fish oil was shown in Table 5 below (unit: peak area/10000).

TABLE 5

| compound | (+) control | (−) control | T1 | T2 | T3 | T4 | T5 | T6 |
|---|---|---|---|---|---|---|---|---|
| Hexanal | 12,289 | 17,596 | 12,285 | 15,074 | 15,202 | 14,669 | 14,773 | 15,061 |
| Heptanal | 19,778 | 27,217 | 19,562 | 26,472 | 24,068 | 23,556 | 23,985 | 23,551 |
| 2-Nonenal, (Z) - | 6,678 | 7,038 | 6,002 | 6,773 | 6,480 | 6,193 | 6,690 | 6,456 |
| 2,4-Heptadienal, (E,E) - | 50,063 | 51,784 | 40,137 | 49,414 | 49,408 | 47,646 | 47,391 | 51,436 |
| 2-Hexenal, (E) - | 10,341 | 12,989 | 10,300 | 12,638 | 12,240 | 12,080 | 12,483 | 12,827 |
| 2,6-Nonadienal, (E,Z) - | 5,540 | 5,491 | 4,498 | 5,253 | 5,149 | 5,422 | 4,852 | 5,470 |
| 2-Nonanone | 3,433 | 3,550 | 3,055 | 3,426 | 3,477 | 3,233 | 3,388 | 3,738 |
| 2-Pentenal, (E) - | 25,577 | 38,026 | 27,287 | 36,002 | 33,736 | 31,754 | 31,830 | 33,584 |
| 1-Penten-3-one | 11,944 | 17,721 | 12,762 | 16,680 | 15,810 | 14,719 | 14,839 | 15,338 |
| Disulfide, dimethyl | 870 | 1,086 | 903 | 1,040 | 1,031 | 972 | 948 | 1,042 |

In Table 5 above, the positive (+) control was a group to which L-ascorbic acid was added, and the negative (−) control was a group to which an antioxidant or polyphenol was not added.

According to the result shown in Table 5, hexanal, which was found as an indicator of rancidity, was seen in low intensity in the positive control and T1 composition showed a similar, low intensity of hexanal to the positive control.

The components such as heptanal that were involved in the fishy smell of fish oil and characteristic grassy smell were reduced in all the polyphenol compositions compared to those in the negative control. Among them, T1 composition exhibited the most excellent reducing effect.

The component 2,4-heptadienal ((E,E)-) is known to cause a strong fatty odor and fishy smell, and it has been reported that while present in fresh seafood, the component is produced by auto-oxidation of polyunsaturated fatty acids, and the content is increased. Treatment with the polyphenol compositions, especially with T1 composition, highly inhibited the production of 2,4-heptadienal ((E,E)-), compared to that with the positive control.

Also, enal and dienal compounds are volatile components of fish and appear to play an important role in the formation of a fishy smell. In addition, components such as disulfide and dimethyl were identified as strong bad smell components. It was found that the treatment with the polyphenol compositions inhibited the overall occurrence of the enal, dienal, disulfide, and dimethyl components involved in the rancid flavor.

The result of measuring changes in volatile aroma components of the compositions prepared by varying the content of polyphenol components from the T1 polyphenol composition is shown in Table 6 below.

TABLE 6

| compound | S1 | S2 | S3 | S4 | S5 | S6 |
|---|---|---|---|---|---|---|
| Hexanal | 12,285 | 13,523 | 13,222 | 13,533 | 12,933 | 12,308 |
| Heptanal | 19,562 | 21,684 | 21,341 | 21,253 | 20,432 | 19,784 |
| 2-Nonenal, (Z) - | 6,002 | 7,032 | 6,885 | 6,730 | 6,681 | 6,650 |
| 2,4-Heptadienal, (E,E) - | 40,137 | 52,939 | 52,425 | 51,386 | 49,480 | 49,147 |
| 2-Hexenal, (E) - | 10,300 | 10,155 | 11,323 | 11,410 | 11,479 | 10,370 |
| 2,6-Nonadienal, (E,Z) - | 4,498 | 5,786 | 5,634 | 5,571 | 5,566 | 5,510 |
| 2-Nonanone | 3,055 | 3,504 | 3,347 | 3,327 | 3,323 | 3,280 |
| 2-Pentenal, (E) - | 27,287 | 29,737 | 31,320 | 29,807 | 28,474 | 27,454 |
| 1-Penten-3-one | 12,762 | 14,649 | 15,006 | 13,538 | 13,443 | 12,767 |
| Disulfide, dimethyl | 903 | 1,535 | 1,081 | 977 | 933 | 923 |

According to the result of Table 6 above, it was found that the efficacy of changing the volatile aroma components was not significantly different even when changing the content of each component of chlorogenic acid, caffeic acid, and quinic acid contained in T1 composition.

Experimental Example 6: A Method for Measuring the Preservative Effect of the Polyphenol-Containing Composition To confirm the preservative effect of the polyphenol compound-containing composition, the antioxidant effect and browning-inhibitory effect were measured. The antioxidant effect was determined by measuring the DPPH radical scavenging activity, and the Rancimat measurement method, in which oxidation stability can be determined by accelerated induction of fat rancidification, was additionally used. The browning-inhibitory effect was determined by measuring the polyphenol oxidase-inhibitory activity.

Experimental Example 7: DPPH Radical Scavenging Activity Measurement 4 mM of DPPH solution in ethanol was prepared and used after the absorbance was adjusted to 1.000±0.1. 0.2 mL of each sample was added to a test tube, 2.8 mL of DPPH solution was mixed and allowed to react for 10 minutes, and the absorbance was measured at 517 nm by using a microplate reader (M2, Molecular Device, Canada). L-ascorbic acid was used as a positive control. The DPPH radical scavenging activity was calculated from the following formula:

$$\text{DPPH radical scavenging activity (\%)}=[1-(A/B)]\times 100$$

(A: absorbance of a group with addition of sample, B: absorbance of a group without addition of sample)

The result of analyzing the DPPH radical scavenging activity is shown in Table 7 below. There was a difference depending on the polyphenol compositions. Among the compositions, T1 composition exhibited the highest scavenging activity and the other compositions other than T3 composition showed the radical scavenging activity.

TABLE 7

| | (+) control | (−) control | T1 | T2 | T3 | T4 | T5 | T6 |
|---|---|---|---|---|---|---|---|---|
| DPPH (%) | $81.07 \pm 0.59^{a}$ | $0.00 \pm 0.00^{e}$ | $36.73 \pm 2.95^{b}$ | $29.14 \pm 2.36^{c}$ | $0.60 \pm 1.04^{e}$ | $32.80 \pm 1.45^{bc}$ | $29.05 \pm 2.73^{c}$ | $22.06 \pm 4.71^{d}$ |

* Duncan's multiple range test at $p < 0.05$

As a result of determining the change in the radical scavenging effect by varying the content ratio of polyphenol components in T1 composition, which exhibited the most excellent effect, the effect tended to increase when similarly adjusting the composition ratio of the three polyphenols. In particular, as shown in the result in Table 8, the scavenging effect was high when mixing the content of chlorogenic acid and caffeic acid in a similar proportion.

TABLE 8

| | S1 | S6 |
|---|---|---|
| DPPH (%) | 36.73 ± 2.95[a] | 23.93 ± 0.66[b] |

* Duncan's multiple range test at $p < 0.05$

Experimental Example 8: Determination of Oxidation Stability Measured by Rancimat Method Oxidation stability of lipid was analyzed by using the Rancimat (743 Metrohm Co., Herisau, Switzerland) method. 2.5 g of fish oil [Sigma-Aldrich Co. (St. Louis. MO, USA)] containing 2% of the polyphenol composition was put into a reaction vessel, and air was put at 20 L/hr into lipid on an aluminum heating block controlled at 100° C. to oxidize lipid. The volatile oxidation products generated during this time were transferred to an absorption vessel containing 60 mL of distilled water, and the degree of anti-oxidation was determined through the induction period automatically calculated in accordance with the change of electrical conductivity. For comparison of antioxidative activity, the Antioxidative Index (AI) was calculated by using a lipid sample with no addition of the polyphenol composition as a control group from the following formula: Further, L-ascorbic acid was used as a positive control.

Antioxidative Index (AI)=IG/IC (IG: a control group, IC: a treatment group)

The result of determining the oxidative stability after the addition of each polyphenol composition to fish oil was shown in Table 9. As shown in Table 9, most of the compositions showed similar or higher oxidation stability to the control, and in particular, T1 composition had the highest oxidation stability. The overall trend showed a similar pattern to the DPPH radical scavenging activity result of measuring antioxidative activity.

The result obtained by adding compositions, prepared by varying the content of polyphenol components in T1 composition having the highest oxidation stability, to a sample, and then measuring the oxidation stability of the sample was shown in Table 10 below. As shown in the result in Table 10, the oxidation stability was excellent when mixing the content of chlorogenic acid and caffeic acid in a similar proportion.

TABLE 10

| | S1 | S6 |
|---|---|---|
| IP (min) | 93.00 ± 0.50[a] | 89.56 ± 0.40[b] |
| AI | 1.21 ± 0.15[a] | 1.17 ± 0.01[b] |

* Duncan's multiple range test at $p < 0.05$

Experimental Example 9: Determination of Polyphenol Oxidase (PPO) Inhibitory Activity 1.7 mL of 50 mM phosphate buffer (pH 6.5) and 0.2 mL of PPO (4,276 units/mg) were mixed, and 0.1 mL of each polyphenol composition was added, and the mixture was left in a constant temperature water bath controlled at 25° C. for 15 minutes, and 1 mL of 4 mM catechin solution was added thereto as a substrate, respectively. Then, a change in absorbance for 5 minutes at 420 nm was measured by using a microplate reader (M2, Molecular Device, Canada). The enzyme inhibitory activity was expressed as absorbance reduction (%) represented by the following formula:

$$\text{Inhibition of PPO activity (\%)}=[1-(A/B)]\times 100$$

[A: absorbance of sample, B: absorbance of blank solution]

Table 11 shows the result of measuring the polyphenol oxidase inhibitory activity of each polyphenol composition. According to the result shown in Table 11, T1 composition exhibited the most excellent polyphenol oxidase inhibitory activity.

TABLE 9

| | (+) control | (−) control | T1 | T2 | T3 | T4 | T5 | T6 |
|---|---|---|---|---|---|---|---|---|
| IP (min) | 90.53 ± 1.37[c] | 74.26 ± 1.05[f] | 93.00 ± 0.50[b] | 88.33 ± 0.90[d] | 77.23 ± 1.05[e] | 88.10 ± 0.75[d] | 86.73 ± 0.55[d] | 77.13 ± 0.73[e] |
| AI | 1.22 ± 0.03[c] | 1.00 ± 0.00[f] | 1.25 ± 0.11[b] | 1.19 ± 0.01[d] | 1.04 ± 0.01[e] | 1.18 ± 0.01[d] | 1.17 ± 0.01[d] | 1.04 ± 0.01[e] |

* Duncan's multiple range test a it $p < 0.05$

TABLE 11

| | (+) control | (−) control | T1 | T2 | T3 | T4 | T5 | T6 |
|---|---|---|---|---|---|---|---|---|
| PPO (%) | 22.86 ± 0.70[a] | 0.00 ± 0.00[g] | 22.40 ± 0.88[a] | 17.97 ± 0.46[d] | 19.47 ± 0.75[c] | 10.57 ± 0.75[e] | 8.16 ± 0.24[f] | 9.58 ± 0.49[e] |

* Duncan's multiple range test at $p < 0.05$

The result of measuring the polyphenol oxidase inhibitory activity of the compositions prepared by varying the content of polyphenol components in T1 composition having the highest polyphenol oxidase inhibitory activity was shown in Table 12. As shown in the result in Table 12, the polyphenol oxidase-inhibitory activity was excellent when mixing the content of chlorogenic acid and caffeic acid in a similar proportion.

TABLE 12

| | S1 | S6 |
|---|---|---|
| PPO (%) | 22.86 ± 0.70[a] | 14.96 ± 0.61[b] |

* Duncan's multiple range test at $p < 0.05$

Although representative embodiments of the present application have been described above, the scope of the present application is not limited to the specific embodiments as described above, a person skilled in the art can change the present application within the scope described in the claims of the present application.

What is claimed is:

1. A method for reducing an off-taste or off-flavor, the method comprising adding a composition comprising chlorogenic acid, caffeic acid, and quinic acid to a material generating the off-taste or off-flavor, wherein the material comprises trimethylamine (TMA), wherein the composition reduces the off-taste or off-flavor generated by the trimethylamine (TMA) in the material by a reduction rate of 80% or more, as compared to a control material to which the composition is not added, and wherein the total content of the chlorogenic acid and the caffeic acid is 0.9 to 310 parts by weight based on 100 parts by weight of the quinic acid.

2. The method of claim 1, wherein the content of the caffeic acid is 10 to 400 parts by weight based on 100 parts by weight of the chlorogenic acid.

3. The method of claim 1, wherein the off-flavor is a fishy smell.

4. A method for preparing an off-taste or off-flavor-reducing material, the method comprising adding a composition comprising chlorogenic acid, caffeic acid, and quinic acid to a material generating the off-taste or off-flavor, wherein the material comprises trimethylamine (TMA), wherein the composition reduces the off-taste or off-flavor generated by the trimethylamine TMA) in the material by a reduction rate of 80% or more, as compared to a control material to which the composition is not added, and wherein the total content of the chlorogenic acid and the caffeic acid is 0.9 to 310 parts by weight based on 100 parts by weight of the quinic acid.

5. The method of claim 4, wherein the content of the caffeic acid is 10 to 400 parts by weight based on 100 parts by weight of the chlorogenic acid.

6. The method of claim 4, wherein the off-flavor is a fishy smell.

* * * * *